United States Patent
Chen et al.

(10) Patent No.: US 9,584,873 B2
(45) Date of Patent: Feb. 28, 2017

(54) METHOD AND APPARATUS FOR CONFIGURING AN ELECTRONIC DEVICE

(71) Applicant: Western Digital Technologies, Inc., Irvine, CA (US)

(72) Inventors: Jeffrey Y. Chen, Irvine, CA (US); Scott A. Rader, Irvine, CA (US)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 44 days.

(21) Appl. No.: 14/100,521

(22) Filed: Dec. 9, 2013

(65) Prior Publication Data

US 2015/0106846 A1  Apr. 16, 2015

Related U.S. Application Data

(60) Provisional application No. 61/890,141, filed on Oct. 11, 2013.

(51) Int. Cl.

| | |
|---|---|
| *G06F 3/00* | (2006.01) |
| *G06F 13/00* | (2006.01) |
| *H04N 5/445* | (2011.01) |
| *H04N 21/6547* | (2011.01) |
| *H04N 21/41* | (2011.01) |
| *H04N 21/435* | (2011.01) |
| *H04N 21/81* | (2011.01) |
| *H04L 12/28* | (2006.01) |
| *H04N 21/258* | (2011.01) |
| *H04N 21/422* | (2011.01) |
| *H04N 21/485* | (2011.01) |

(52) U.S. Cl.
CPC ..... *H04N 21/6547* (2013.01); *H04L 12/2809* (2013.01); *H04N 21/25841* (2013.01); *H04N 21/4126* (2013.01); *H04N 21/42202* (2013.01); *H04N 21/435* (2013.01); *H04N 21/485* (2013.01); *H04N 21/8166* (2013.01)

(58) Field of Classification Search
CPC ............ H04N 21/4126; H04N 21/435; H04N 21/6547; H04N 21/8166
See application file for complete search history.

(56) References Cited

U.S. PATENT DOCUMENTS

| | | |
|---|---|---|
| 6,202,070 B1 | 3/2001 | Nguyen et al. |
| 6,247,128 B1 | 6/2001 | Fisher et al. |
| 6,499,054 B1 | 12/2002 | Hesselink et al. |

(Continued)

OTHER PUBLICATIONS

International Search Report and Written Opinion dated Jan. 14, 2015 from related PCT Serial No. PCT/US2014/059976, 13 pages.

*Primary Examiner* — Joshua Taylor
(74) *Attorney, Agent, or Firm* — Young Law Firm, P.C.

(57) ABSTRACT

An electronic device including a peripheral device connection unit configured to connect to a peripheral device and to receive identification data for the peripheral device, and a controller. The controller is configured to determine configuration information, wherein the configuration information is based at least on one of the identification data for the peripheral device or geographic location data for the electronic device, obtain a user interface selected from a plurality of user interfaces based at least partly on the configuration information, and automatically configure the electronic device based on the obtained user interface.

20 Claims, 5 Drawing Sheets

(56) References Cited

U.S. PATENT DOCUMENTS

| | | | |
|---|---|---|---|
| 6,732,158 B1 | 5/2004 | Hesselink et al. | |
| 6,937,997 B1 | 8/2005 | Parulski | |
| 6,983,421 B1* | 1/2006 | Lahti et al. | 715/763 |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,337 B1 | 9/2009 | Parulski | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,028,046 B2 | 9/2011 | Elliott et al. | |
| 8,073,980 B2 | 12/2011 | Kalayjian et al. | |
| 8,089,953 B2 | 1/2012 | Angelot et al. | |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 2005/0144195 A1 | 6/2005 | Hesselink et al. | |
| 2005/0144200 A1 | 6/2005 | Hesselink et al. | |
| 2006/0066578 A1* | 3/2006 | Sugimoto | G06F 3/0489 345/169 |
| 2007/0261030 A1* | 11/2007 | Wadhwa | 717/127 |
| 2008/0141303 A1* | 6/2008 | Walker et al. | 725/39 |
| 2008/0148314 A1* | 6/2008 | Shintani et al. | 725/39 |
| 2009/0251605 A1 | 10/2009 | Hsiao | |
| 2010/0039958 A1 | 2/2010 | Ge et al. | |
| 2010/0122280 A1* | 5/2010 | Sofos et al. | 725/25 |
| 2012/0036041 A1 | 2/2012 | Hesselink | |
| 2012/0159308 A1* | 6/2012 | Tseng et al. | 715/234 |
| 2012/0173767 A1 | 7/2012 | Kim et al. | |
| 2012/0197772 A1* | 8/2012 | Hing | 705/34 |
| 2013/0061297 A1 | 3/2013 | Larsen et al. | |
| 2013/0063455 A1* | 3/2013 | Bayer et al. | 345/522 |
| 2013/0076496 A1* | 3/2013 | Masuda et al. | 340/425.5 |
| 2013/0160050 A1 | 6/2013 | Halgas, Jr. | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |

* cited by examiner

METHOD AND APPARATUS FOR CONFIGURING AN ELECTRONIC DEVICE

CROSS-REFERENCE TO RELATED APPLICATIONS

This application claims the benefit of U.S. Provisional Application No. 61/890,141, filed on Oct. 11, 2013, entitled "AUTO CONFIGURATION OF ELECTRONIC DEVICE," which is hereby incorporated by reference in its entirety.

BACKGROUND

Conventionally, a television was configured to connect to a set top box or an antenna. In such a case, the television was able to receive a cable feed or over the air content. However, the television may be unable to receive other content. To allow the television to receive the other content, the television manufacturer may have to produce a set top box to be connected to the television. However, the cost of manufacturing, distributing, and maintaining a set top box may be cost prohibitive. For example, the set top box may not contain all of the features that the manufacturer wants for a particular television, especially since each manufacturer may have numerous models of televisions.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
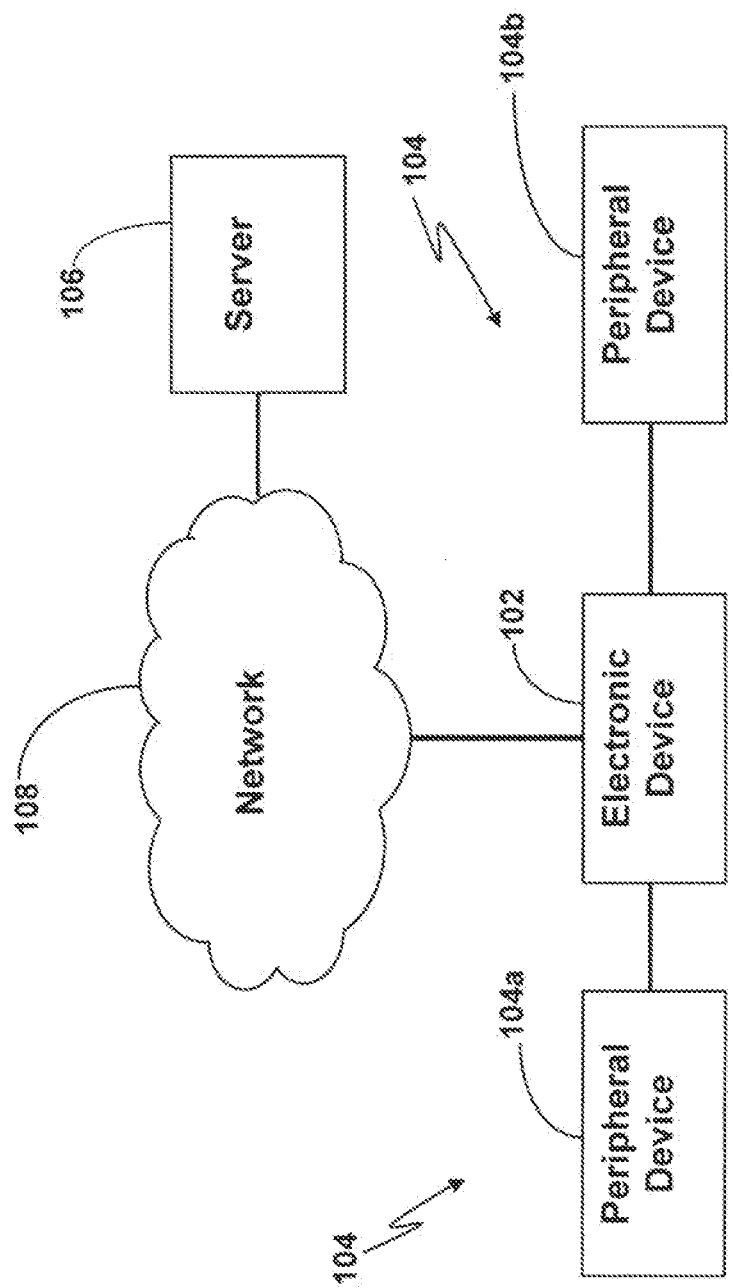
FIG. 1 depicts an electronic device configured to be connected to a server and/or one or more peripheral devices according to an embodiment.

In an embodiment, an electronic device 102 is configured to be connected to one or more peripheral devices 104, a network 108, and a server 106 through the network 108, as shown in an embodiment in FIG. 1.

In an embodiment, the network 108 comprises one or more of a local area network, a wide area network, the Internet, a cable feed, a home network, or other types of interconnectivity which allows the electronic device 102 to access content or one or more peripheral devices 104. In an embodiment, one or more of the peripheral devices 104 may be connected to the network. For example, in the embodiment shown in FIG. 1, the peripheral devices 104 comprise a peripheral device 104a and a peripheral device 104b. In an embodiment, the peripheral device 104a comprises a television, while the peripheral device 104b comprises a set top box, a data storage device, or other devices which may utilize the electronic device 102 to display a user interface and/or content.

In an embodiment, the electronic device 102 comprises a set top box, a media player appliance, a network attached storage device, or other device which can load applications or play content. In an embodiment, the content comprises videos, photos, music, or any combination thereof.

Figure 2:
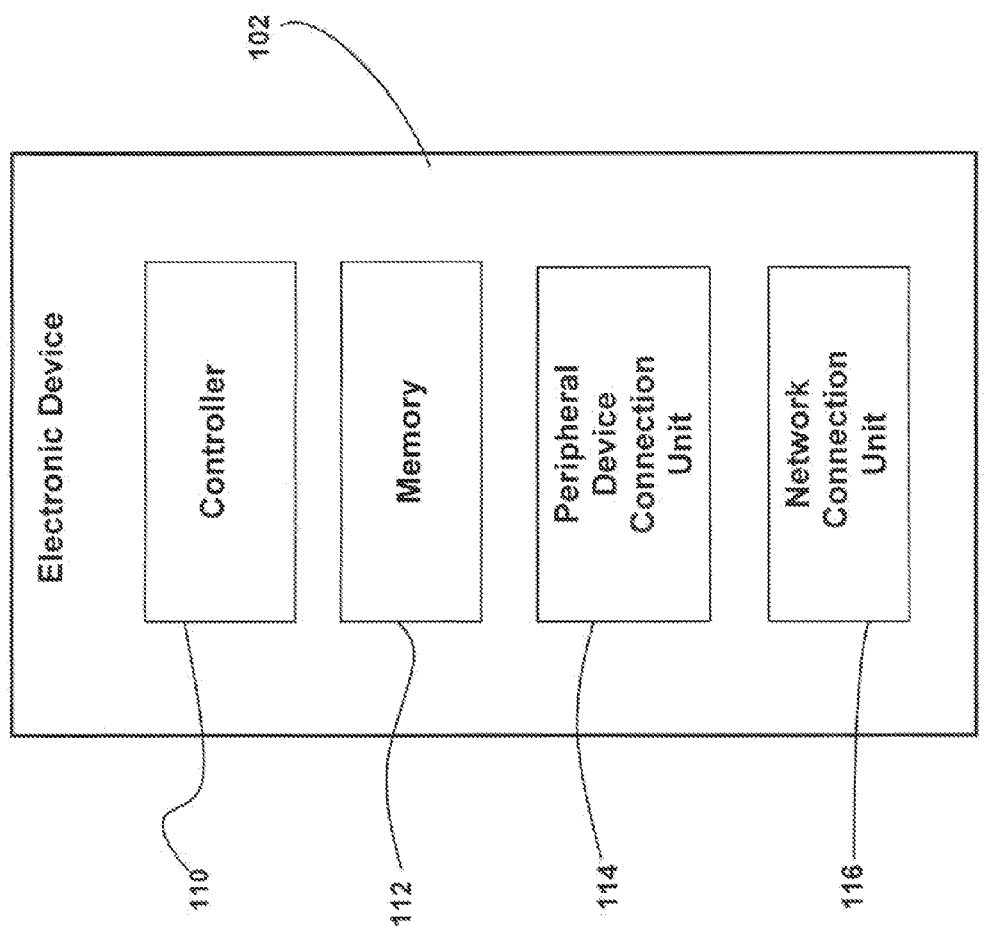
FIG. 2 is a box diagram of an electronic device according to an embodiment.

In the embodiment shown in FIG. 2, the electronic device 102 comprises a controller 110, a memory 112, a peripheral device connection unit 114, and a network connection unit 116. In an embodiment, the electronic device 102 can optionally include a tuner to decode video or audio from a multimedia file. In an embodiment, the memory 112 comprises a hard disk drive, a solid state device, or any combination thereof. In an embodiment, the hard disk drive comprises a magnetic rotating disk. In an embodiment, the solid state device comprises a solid state memory.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In an embodiment, the network connection unit 116 is configured to connect the electronic device 102 to the network 108 and subsequently to the server 106 through the network 108. In an embodiment, the peripheral device connection unit 114 is configured to communicate with one or more peripheral devices 104. In an embodiment, the controller 110 can utilize the peripheral device 114 connection unit to scan, for example, using any of various device discovery protocols, and receive configuration information from the one or more peripheral devices 104.

In an embodiment, the configuration information comprises identification data of the one or more peripheral devices 104. In an embodiment, the identification data comprises information which identifies the peripheral device 104 such as manufacturer name, model information, and other information which may identify the peripheral device 104. In an embodiment, the identification data comprises extended display identification data ("EDID")

In an embodiment, the peripheral device connection unit 114 is configured to communicate to the peripheral device 104 using high-definition multimedia interface ("HDMI"), RVU, Universal Plug and Play ("UPnP"), or other types of communication protocols or interfaces. In an embodiment, RVU comprises an RVU protocol which is approved by the RVU Alliance. In an embodiment, the network connection unit 116 can also be configured to connect to the peripheral device 104 to receive the configuration information. In an embodiment, the network connection unit 116 is configured to communicate with the peripheral device 104 using Bluetooth, near field communication, digital living network alliance ("DLNA"), or other types of communication protocols or interfaces.

In an embodiment, the peripheral device connection unit 114 comprises a display output, serial interfaces, connection units, or other types of communications devices. In an embodiment, the network connection unit 116 comprises a network card, wireless transceivers, connection units, or other types of communications devices. In an embodiment, the display output is configured to provide a connection over high-definition multimedia interface ("HDMI"). In an embodiment the network card comprises an Ethernet card, a Bluetooth transceiver, or any combination thereof. In an embodiment the wireless transceivers can be configured to connect over WiFi.

In an embodiment, the controller 110 can also utilize the network connection unit 116 to determine additional configuration information, such as geographic location data for the electronic device 102. In an embodiment, the geographic location data can indicate where the electronic device 102 is located. For example, the geographic location data can indicate a country, state, city, zip code, or any combination thereof of where the electronic device 102 is located. In an embodiment, the geographic location data is determined using an Internet Protocol ("IP") address, such as a public IP address associated with the electronic device 102. In an embodiment, the public IP address associated with the electronic device 102 can comprise, for example, an IP address associated with a router that the electronic device 102 is connected to in order to gain access to the network 108.

In an embodiment the controller 110 is configured to store the configuration information in the memory 112. The controller 110 can also utilize the network connection unit 116 to transmit the configuration information to the server 106. In an embodiment, the server 106 can transmit, and the controller 110 can receive a user interface from the server 106 based on the configuration information transmitted to the server 106. In an embodiment, the server 106 may store a plurality of user interfaces. Thus, the controller 110 can obtain the user interface selected from a plurality of user interfaces based at least partially on the configuration information.

In an embodiment, the controller 110 can configure the electronic device 102 based on the received user interface. In an embodiment, the controller 110 automatically configures the electronic device 102 based on the received user interface. In an embodiment, the user interface comprises applications available, application information, order of applications to be displayed on the user interface, data to be collected, advertisements displayed on the user interface, content recommendations, connection settings, network locations of operator services, or any other types of configurations which may be customized. In an embodiment, the user interface may also be accompanied by other configuration data such as configurations for the user interface, device settings, and/or remote control settings.

In an embodiment, the controller 110 can periodically transmit the configuration information to the server 106 to determine if an updated user interface is available and whether the current user interface should be updated. In an embodiment, the controller 110 can periodically update the user interface when an updated user interface is available.

In an embodiment, at least some of the user interfaces may be stored in the memory 112. Thus, instead of transmitting the configuration information to the server 106, the controller 110 can retrieve the user interface corresponding to the configuration information from the memory 112. In an embodiment, the controller 110 automatically configures the electronic device 102 based on the user interface retrieved from the memory 112. In an embodiment, the controller 110 can subsequently transmit the configuration information to the server 106 to determine if there is an updated user interface.

Thus, the electronic device 102 may be used in association with different companies looking to utilize the electronic device for its customers without having to manufacture the electronic device 102. For example, a first company which manufactures a television may wish to configure the electronic device 102 in a first manner, while a second company which supplies cable television programming may wish to configure the electronic device 102 in a second manner different than the first manner.

In an embodiment, the electronic device 102 can provide a first user interface to configure the electronic device 102 in the first manner, and a second user interface to configure the electronic device 102 in the second manner. Thus, the first company and the second company can both utilize the same electronic device 102. In an embodiment, this reduces a cost of the first company and/or the second company since they will not have to manufacture the electronic device 102, keep track of inventory of the electronic device 102, utilize unique stock keeping unit ("SKU") for the electronic device 102, or otherwise handle complex logistics for the electronic device 102. Instead, the first company and/or the second company can just design the user interface which will be utilized by the electronic device 102 to customize the electronic device 102 as desired by the first company and/or the second company.

Furthermore, the first company and/or second company may have reduced costs with respect to ensuring compatibility of the electronic device 102 with other peripheral devices 104, maintenance of the electronic device 102, or other ancillary costs associated with supporting the electronic device 102.

In an embodiment, the electronic device 102 may also be portable, allowing for a client of a company to take the electronic device 102 with them when the client moves, which can reduce installation costs. In an embodiment, the electronic device 102 may also provide additional features which complement the peripheral device 104. In an embodiment, if the company manufactures the peripheral device 104, the company can set the user interface to complement features offered in the peripheral device 104. For example, a cable company may produce a peripheral device 104 which comprises a set top box. In such a case, the electronic device 102 may include features that complement the set top box, such as applications which the set top box may not have. The electronic device 102 may be configured to complement a variety of peripheral devices 104, such as set top boxes, televisions, Blu-ray players, home theater systems, and/or the like.

Furthermore, in an embodiment, the electronic device 102 may allow for targeted information to be presented to the user based on a geographic location of the electronic device 102. For example, the user interface can be customized based on the geographic location data of the electronic device 102. In an embodiment, this can allow for targeted advertising. Furthermore, this can also allow for selective rollouts of certain features in the user interface. This can be especially useful to gauge consumer reaction to certain features.

Figure 3:
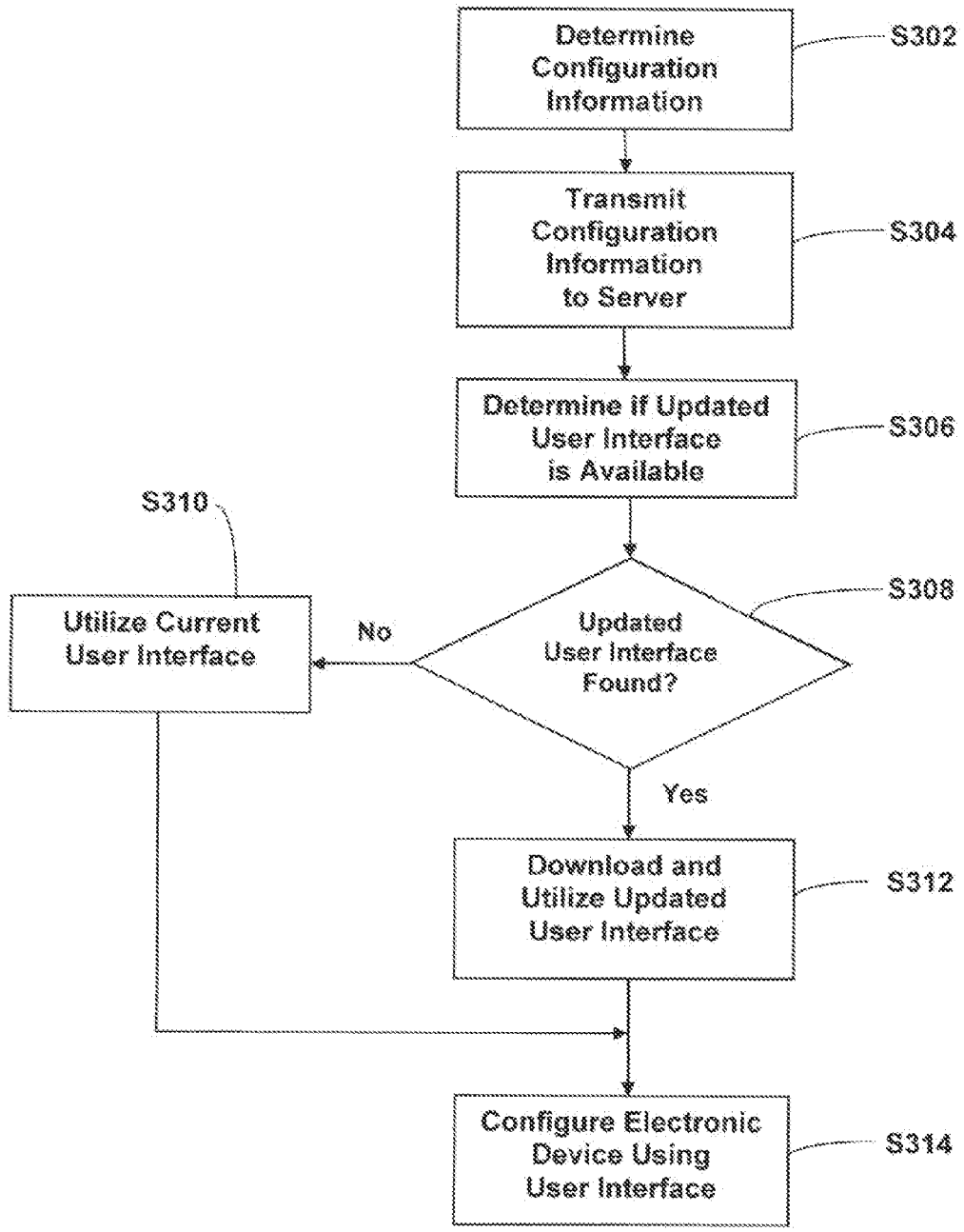
FIG. 3 depicts a process for configuring an electronic device according to an embodiment.

In an embodiment, a process for configuring the electronic device 102 is shown in an embodiment in FIG. 3. In block S302 the controller 110 determines configuration information of a connected peripheral device 104. For example, the controller 110 can determine identification data for the peripheral device 104 and geographic location data of the electronic device 102, which will be described in more detail below. Furthermore, in an embodiment, the controller 110 can ask the user to provide confirmation of the configuration information, which will be described in more detail below.

In block S304, the controller 110 is configured to transmit the configuration information to the server 106. In an embodiment, when the controller 110 transmits the configuration information to the server 106, the server 106 can utilize a database of manufacturers and match it with the manufacturer indicated by the configuration information to determine the appropriate user interface to send to the electronic device 102. For example, the server 106 can determine the manufacturer using the EDID information.

In an embodiment, when the controller 110 transmits the configuration information to the server 106, the server 106 can utilize a database of geographic location information and match it with the geographic location indicated by the geographic location data in the configuration information to determine the appropriate user interface to send to the electronic device 102. In an embodiment, the database of geographic location information can comprise a list of cable, satellite, and digital TV providers which would correspond to the geographic location data. For example, for a first city, there may only be two companies which provide cable, satellite, and digital TV, while in a second city, there may be four companies which provide cable, satellite, and digital TV.

In some instances, more than one user interfaces may be available based on the configuration information. In such a case, the server 106 can transmit such information to the electronic device 102, and the electronic device 102 can query the user to determine which user interface is the most appropriate one.

For example, if there are three possible manufacturers or models of the peripheral device, then the electronic device 102 can ask the user to select which of the three peripheral devices is the correct one. The corresponding user interface for the peripheral device can then be transmitted by the server and received by the electronic device 102. Similarly if there are three possible cable, satellite, or digital TV providers available, then the electronic device can ask the user to select which of the three possible cable, satellite, or digital TV providers is the correct one. The corresponding user interface for the cable, satellite, or digital TV provider can then be transmitted by the server 106 and received by the electronic device 102. Thus, the controller 110 may obtain a user interface selected from a plurality of user interfaces based at least partly on the configuration information.

In block S306 the controller 110 determines if an updated user interface is available. In block S308, if updated user interface is not found, then in block S310, the electronic device 102 can utilize the current user interface, such as one which is stored in the memory 112. Alternatively, in block S308, if there is an updated user interface, then in block S312, the electronic device 102 can download and install the latest user interface from the server 106. In an embodiment, an updated user interface need not be a completely new or different user interface. Instead an updated user interface may comprise partially overlapping features as the current user interface. In block S314, the controller 110 can auto configure the electronic device 102 based on the existing user interface or the latest user interface from the server 106.

Figure 4:
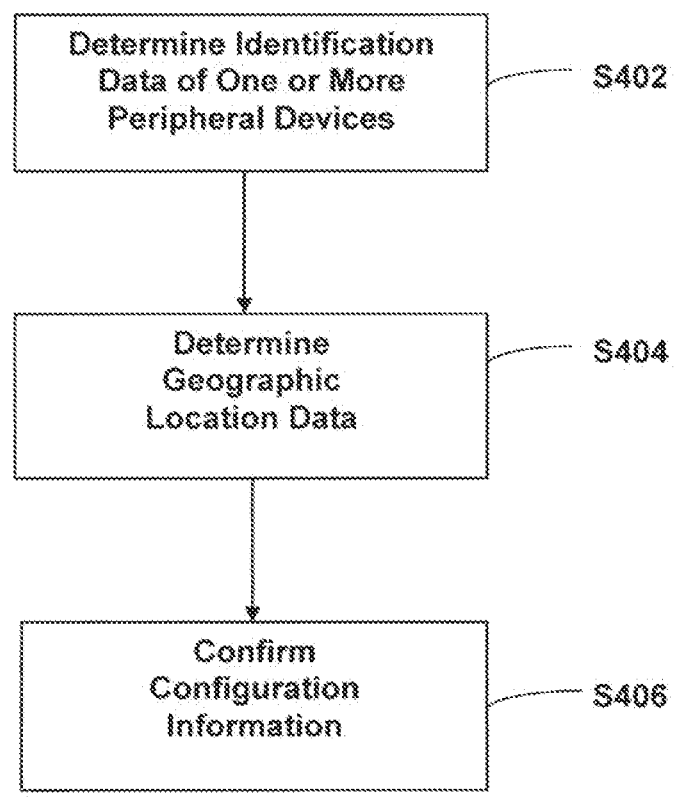
FIG. 4 depicts a process for configuring an electronic device according to an embodiment.

In an embodiment, one or more steps performed in the block S302 or other blocks depicted in an embodiment in FIG. 3, is shown in an embodiment in FIG. 4. In block S402, the controller 110 determines identification data for the peripheral device 104. For example, if the peripheral device 104 comprises a display, the controller 110 determines identification data by checking the connected display's EDID information using the peripheral device connection unit 114. In an embodiment, the EDID information can be obtained through an HDMI connection. However, in an embodiment, the identification data can also be obtained through a network connection, such as by using the network connection unit 116.

In block S404, the controller 110 determines geographic location data of the electronic device 102. In an embodiment, the controller 110 determines the geographic location data of the electronic device 102 based on the IP address associated with the electronic device 102 or a public IP address of a gateway/router on the local network where the electronic device 102 is located. For example, the controller can provide an associated IP address to a geo-location service (e.g., reachable by the Internet) and obtain the geographic location of the electronic device 102 (e.g., city, zip code, region, etc.).

In block S406, the controller 110 can provide a confirmation option for the user to confirm the configuration information. That is, the user can confirm whether one or more of the configuration information is correct. If it is not, the user can manually configure the configuration information.

For example, the user may be asked to confirm that the manufacturer or model of the peripheral device 104 is correct. Similarly, the user may be asked to confirm if the geographic location data is correct. That is, the geographic location data may indicate that the electronic device 102 is in one city but the electronic device 102 is actually in another city. This may occur if the user is near a boundary of two cities.

If the configuration information is not correct, the user may be able to manually select which of the configuration information should be utilized. For example, the user may be able to select a manufacturer or model of the peripheral device 104 from a list of possible peripheral devices. Similarly, the user may be able to manually select which city or geographic location the electronic device 102 is in.

In an embodiment, the controller 110 can be configured to revise the configuration information based on user input from a remote control. In an embodiment, the remote control can be configured to wirelessly connect to the electronic device 102 or portions of the electronic device 102. In an embodiment, the remote control can be part of the electronic device 102, even if the remote control wirelessly connects to the electronic device 102 or portions of the electronic device 102.

Figure 5:
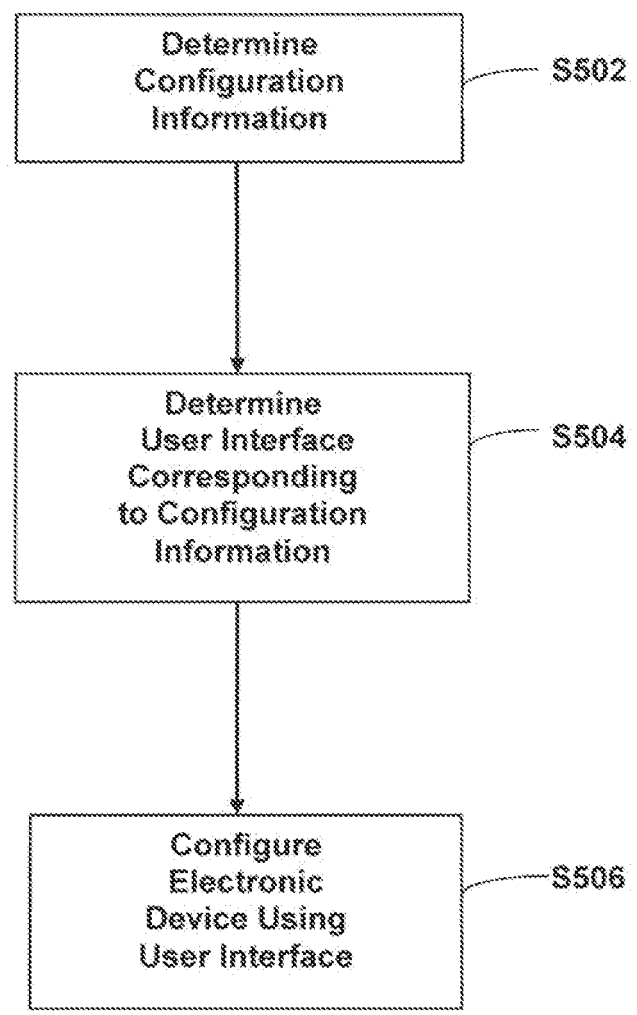
FIG. 5 depicts a process for configuring an electronic device according to an embodiment.

In an embodiment, a process for configuring the electronic device 102 is shown in an embodiment in FIG. 5. In block S502, the controller 110 determines configuration information. For example, the controller 110 determines the identification data for the peripheral device 104 and/or the geographic location data for the electronic device 102.

In block S504, the controller 110 determines the user interface corresponding to the configuration information. For example, instead of having the database be located on the server 106, the database may be located in the electronic device 102. In an embodiment, the database may be located in the memory 112. Furthermore, in an embodiment, a plurality of user interfaces may be stored in the memory 112. In such a case, the electronic device 102 can determine the user interface corresponding to the configuration information by accessing the memory 112 and obtaining the user interface from the plurality of user interfaces stored in the memory 112 based at least partly on the configuration information. In an embodiment, if there are more than one user interfaces available, the controller 110 can query the user to select the appropriate configuration information to determine which user interface to utilize. In block S506, the controller 110 can configure the electronic device 102 using the user interface corresponding to the configuration information.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. An electronic device comprising:
a peripheral device connection unit configured to connect to a peripheral device that is separate from and coupled to the electronic device and to receive identification data from the peripheral device, the identification data being configured to identify the peripheral device;
a network connection unit configured to connect to a server configured to store a plurality of user interfaces, the server being separate from the electronic device and from the peripheral device;
memory, configured to store a plurality of user interfaces for the electronic device; and
a controller configured to:
determine configuration information, wherein the configuration information is based at least partly on the identification data received from the peripheral device;
configure the electronic device using a selected one of the plurality of user interfaces stored in the memory;
obtain an updated user interface of a plurality of user interfaces stored on a server by:
periodically transmitting the configuration information to the server;
determining when the updated user interface for the electronic device is available; and
when the updated user interface for the electronic device is available, receiving a selected updated user interface for the electronic device from among the plurality of user interfaces stored on the server, the updated user interface being selected based at least partly on the transmitted configuration information; and
automatically configure the electronic device based on the selected updated user interface received from the server.

2. The electronic device of claim 1 wherein the selected user interface comprises at least application information for the electronic device.

3. The electronic device of claim 2 wherein the application information comprises at least an order of applications to be displayed on the selected user interface.

4. The electronic device of claim 1 wherein the received identification data comprises manufacturer information and model information for the peripheral device.

5. The electronic device of claim 1, wherein the controller is further configured to determine the configuration information based on geographic location data for the electronic device and on the received identification data, wherein the geographic location data is determined based at least partly on an Internet Protocol ("IP") address.

6. The electronic device of claim 5 wherein the IP address comprises a public IP address associated with the electronic device.

7. The electronic device of claim 1 wherein the controller is configured to obtain the selected user interface by:
accessing the memory and selecting a user interface from the plurality of user interfaces stored in the memory, based at least partly on the configuration information.

8. The electronic device of claim 1 wherein the controller is further configured to:
revise the determined configuration information based on user input from a remote control.

9. The electronic device of claim 1 wherein the peripheral device comprises a television.

10. A method for configuring an electronic device comprising:
determining configuration information using a controller in the electronic device, wherein the configuration information is based at least partly on identification data received from a peripheral device that is separate from and connected to the electronic device, the identification data being configured to identify the peripheral device;
configuring the electronic device using a selected one of a plurality of user interfaces stored in a memory of the electronic device;
obtaining, using the controller in the electronic device, an updated user interface of a plurality of user interfaces stored on a server that is separate from the electronic device and from the peripheral device by:

periodically transmitting the configuration information to the server;

determining when the updated user interface for the electronic device is available; and when the updated user interface for the electronic device is available, receiving a selected updated user interface for the electronic device from among the plurality of user interfaces stored on the server, the updated user interface being selected based at least partly on the configuration information transmitted to the server; and automatically configuring the electronic device based on the selected updated user interface received from the server, using the controller in the electronic device.

11. The method of claim 10 wherein the selected user interface comprises at least application information for the electronic device.

12. The method of claim 11 wherein the application information comprises at least an order of applications to be displayed on the selected user interface.

13. The method of claim 10 wherein the received identification data comprises manufacturer information and model information for the peripheral device.

14. The method of claim 10, further comprising determining the configuration information based on geographic location data for the electronic device and on the received identification data, wherein the geographic location data is determined based at least partly on an Internet Protocol ("IP") address.

15. The method of claim 14 wherein the IP address comprises a public IP address associated with the electronic device.

16. The method of claim 10 wherein configuring the electronic device using a selected one of a plurality of user interfaces stored in a memory of the electronic device comprises: accessing the memory in the electronic device and selecting the user interface from the plurality of user interfaces stored in the memory based at least partly on the configuration information.

17. The method of claim 10 further comprising:
revising the determined configuration information based on user input from a remote control.

18. An electronic device comprising:

a peripheral device connection unit configured to connect to a peripheral device that is separate from and coupled to the electronic device and to receive identification data from the peripheral device, the identification data being configured to identify the peripheral device;

a network connection unit configured to connect to a server configured to store a plurality of user interfaces, the server being separate from the peripheral device and from the electronic device, and configured to connect to the electronic device and to receive identification data sent to the electronic device by the peripheral device;

memory, configured to store a plurality of user interfaces for the electronic device; and a controller configured to:
determine configuration information, wherein the configuration information is based at least partly on the identification data received from the peripheral device;

configure the electronic device using a selected one of the plurality of user interfaces stored in the memory;

obtain an updated user interface of a plurality of user interfaces stored on a server by:
periodically transmitting the configuration information to the server;

determining when the updated user interface for the electronic device is available; and when the updated user interface for the electronic device is available, receiving a selected updated user interface for the electronic device from among the plurality of user interfaces stored on the server, the updated user interface being selected based at least partly on the transmitted configuration information; and automatically configure the electronic device based on the selected updated user interface received from the server.

19. The electronic device of claim 18 wherein the selected user interface comprises at least application information for the electronic device.

20. The electronic device of claim 19 wherein the application information comprises at least an order of applications to be displayed on the selected user interface.

* * * * *